Figure 1:
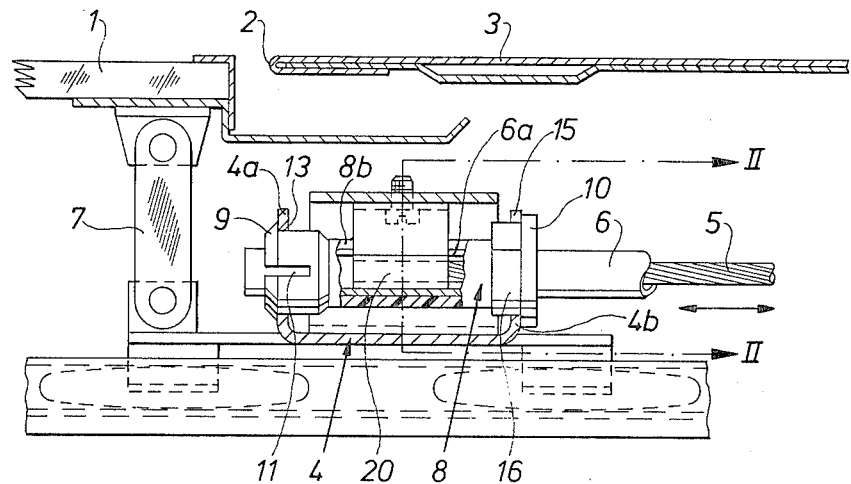

United States Patent [19]

Jardin et al.

[11] 4,056,274
[45] Nov. 1, 1977

[54] VEHICLE SLIDING ROOF CONSTRUCTION

[75] Inventors: Hans Jardin, Krailling, Germany; Jack Auzannet, Conflans Ste., Honorine, France

[73] Assignee: Webasto-Werk W. Baier KG, Germany

[21] Appl. No.: 641,283

[22] Filed: Dec. 16, 1975

[30] Foreign Application Priority Data

Dec. 21, 1974   Germany .............................. 2461018

[51] Int. Cl.² .............................................. B60J 7/10
[52] U.S. Cl. ............................................... 296/137 G
[58] Field of Search ........... 296/137 E, 137 F, 137 G, 296/137 H

[56]  References Cited

U.S. PATENT DOCUMENTS

| 3,075,806 | 1/1963 | Gmeiner | 296/137 E |
| 3,568,364 | 3/1971 | Schmid | 296/137 E |

FOREIGN PATENT DOCUMENTS

| 923,270 | 9/1961 | United Kingdom | 296/137 G |

Primary Examiner—Robert R. Song
Attorney, Agent, or Firm—Craig & Antonelli

[57]  ABSTRACT

A vehicle sliding roof construction with a rigid sliding roof articulated to a transport bridge which is U-shaped in cross section, whereon engages a driving cable which is guided in a slotted pipe mounted on the fixed roof portion, whereby the pipe is guided in a tubular body fixed to the transport bridge at least when the roof is in an open position.

13 Claims, 5 Drawing Figures

VEHICLE SLIDING ROOF CONSTRUCTION

The invention relates to a vehicle sliding roof construction with a rigid sliding roof articulated to a transport bridge which is U-shaped in cross-section, whereon engages a driving cable which is rigid under pressure and is guided in a slotted pipe mounted on the fixed roof portion, whereby the pipe is guided in a tubular body fixed to the transport bridge at least when the roof is in the open position.

In a known sliding roof construction of this type the tubular member is a metal tube which is welded or soldered to the transport bridge, whereby the driving cable is screwed to an extension of the transport bridge. In this known construction it is disadvantageous that the attachment of the metal pipe to the transport bridge is relatively complicated and costly, that rattling can occur due to the vibrations of the cable guidance pipe in the metal tube, that a lubricating system must be provided for the cable guidance pipe guide in the metal tube and that the attachment of the driving cable to an extension of the transport bridge requires additional space.

The problem of the present invention is to obviate the disadvantages of the known construction and therefore in particular to bring about a rattle-free and maintenance-free guidance of the cable guidance pipe, a simplified attachment of the tubular body of the transport bridge and a space-saving attachment of the driving cable to the transport bridge.

According to the invention, this problem is solved in that the tubular body comprises a longitudinally slotted plastic member which passes through the arms of the transport bridge and is securely fixed to the said transport bridge so that it cannot rotate and become axially displaced, and wherein the driving cable is fixed to the transport bridge within the same by means of a clamping collar which projects through the longitudinal slot of the tubular body.

Due to its elasticity, such a longitudinally slotted plastic pipe can engage in correspondingly shaped openings in the transport bridge arms so that there is no need for additional process stages for fixing the plastic pipe. Such a plastic pipe prevents rattling and requires no lubrication. As a result of the attachment of the driving cable within the transport bridge, no additional space is required for this attachment.

Preferably, both ends of the tubular body are provided with flanges which engage on the outsides of the transport bridge arms so that the tubular body is secured against axial displacement. One end of the tubular body is provided with axial slots in order to permit a compression of this end and a passage thereof through openings in the arms, whilst the other end is provided with surfaces which cooperate with corresponding surfaces in an opening in one of the arms in order to secure the tubular body against twisting. The tubular body can, for example, be made from polyamide or PTFE.

For fixing the driving cable to the transport bridge, a bracket, extending over the tubular body can be fitted to the cross-member of the transport bridge and the cable collar is then screwed to the said bracket, whereby openings are provided in the cross-member via which the attachment screws are accessible from below. Consequently, the driving cable can be fixed without difficulty to the transport bridge when the sliding roof construction is already fitted.

The end of the driving cable need not be fixed directly to the transport bridge but can instead be fixed to an extension pipe which is secured to the transport bridge by means of a mounting support which passes through the longitudinal slot of the tubular body and forms a guide for the fixed cable guidance tube. As this extension pipe is preferably made from metal for strength reasons, its outer surface must be covered with fibres in order to prevent rattling caused by vibrations between the extension pipe and the fixed cable guidance tube placed over the same.

Figure 2:
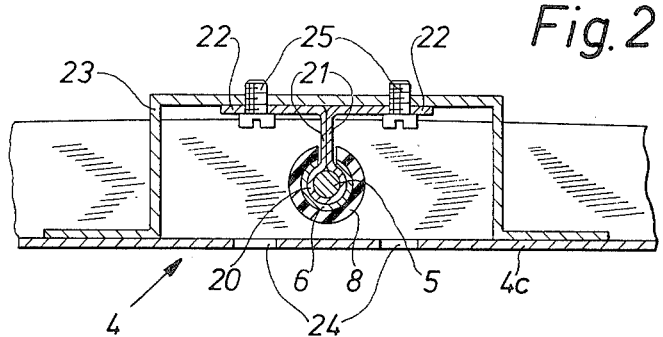
Figure 3:
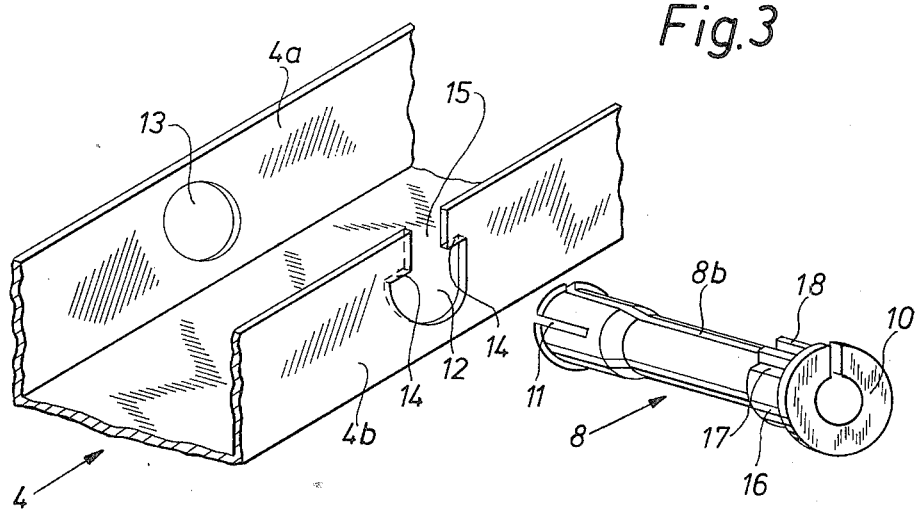
Figure 4:
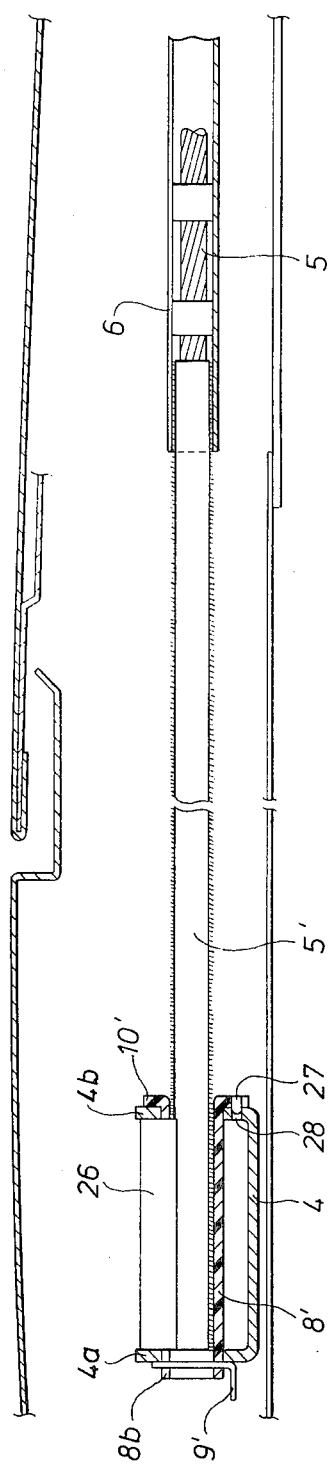
Figure 5:
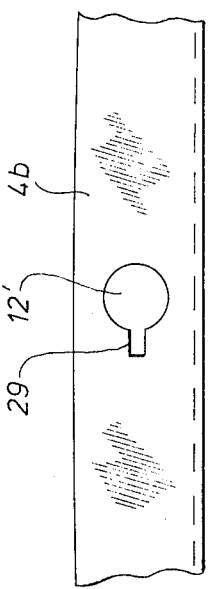

Two embodiments of the invention are described hereinafter with reference to the drawings, wherein show:

FIG. 1, a partial section through a vehicle sliding roof construction in the longitudinal central plane of the vehicle with a first embodiment of the invention;

FIG. 2, the cross-section along the line II—II of FIG. 1;

FIG. 3, a perspective exploded view of part of the transport bridge and the tubular body of the construction shown in FIGS. 1 and 2;

FIG. 4, a partial section similar to FIG. 1 with a second embodiment of the invention;

FIG. 5, a detail of the construction of FIG. 4.

In FIG. 1, 1 is the rigid sliding roof, e.g. a glass roof of a vehicle sliding roof construction which in the closed state seals a roof opening 2 on which on opening can be drawn underneath the fixed roof portion 3. In conventional manner, the sliding roof 1 in the area of its front edge is guided by means of sliding shoes in lateral guide rails fixed to the fixed roof portion, and in the area of its back end is articulated to a transport bridge which is U-shaped in cross-section and displaceable in the same slide rails. To transport bridge or slide 4 is fixed a driving cable or core 5 which is rigid under pressure and guided in a longitudinally slotted guidance tube or tubular sheath 6 secured to the fixed roof portion, being the cable displaceable in one or other longitudinal direction by means of an electric motor or manually. During this displacement, the transport bridge 4 is also moved and in turn via a schematically represented lever mechanism 7 also moves sliding roof 1.

In the area of transport bridge 4, guiding tube 6 is received in a tubular longitudinally slotted plastic body 8 which passes through the arms 4a and 4b of the transport bridge and is held therein so that it cannot twist or become axially displaced relative to the transport bridge 4. For axial fixing purposes, both ends of the tubular body 8 are provided with flanges 9 or 10 which engage on the outsides of arms or walls 4a and 4b of the transport bridge. The end of tubular body 8 provided with flange 9 has axial slots 11 enabling this end to be compressed and passed through the openings or apertures 12 and 13 in arms 4a and 4b. On release this end again assumes its shape shown in FIG. 1 in which flange 9 overlaps opening 13. Whereas opening 13 is circular, opening 12 has a basic semi-circular configuration with straight shoulders 14 from which a slot 15 extends to the upper edge of arm 4b. The end of tubular body 8 provided with flange 10 has a portion 16 which in cross-section corresponds to the basic configuration of opening 12 and has surfaces 17 cooperating with the straight shoulders 14 as well as cross-members projecting into slot 15. The cross-members 18 prevent tubular body 8 from rotating, whilst surfaces 17 which cooperate with shoulders 14 secure the inserted tubular body 8 against an upwards displacement. For the purpose of fixing the driving cable 5 to the transport bridge 4, the end of the driving cable is provided with a cable collar or clamp 20 whose cross bars or radical extensions 21 extend upwards through slot 6a in guiding tube 6 and through the longitudinal slot 8b in tubular body 8 and are externally bent over in opposite direction to form flanges 22 which are screwed to a bracket 23 which is fixed, e.g. spot-welded to cross-member or base portion 4c of transport bridge 4. To be able to subsequently fit the driving cable 5 to the transport bridge, i.e. after incorporating the sliding roof construction in the vehicle, cross-member 4c of transport bridge 4 has holes 24 through which access can be obtained to attachment screws 25.

On displacing the sliding roof 1 by displacing transport bridge 4 by means of driving cable 5, tubular body 8 is moved over and is guided on the fixed guiding tube 6. As tubular body 8 is made from plastic, rattling is impossible and no lubrication is necessary. As shown in FIG. 1 the tube 6 may extend beyond the tubular body, but this is optional. As seen in FIG. 4, the tube 6 may end short of the tubular body 8. All that is needed, obviously, is that the tubular body 8 be large enough to slidably receive the tube 6.

As compared with known constructions, the fitting of the tubular body is very simple because this only has to be passed through the openings 12 and 13, from the right in FIG. 1 until flanges 9 and 10 engage on the outer surfaces of arms 4a and 4b. By securing the driving cable 5 within the transport bridge 4 no additional space is required for fixing the driving cable.

In the embodiment of FIG. 4 the longitudinally slotted tubular plastic body 8' is fixed to the transport bridge 4 so that it cannot become axially displaced through its end, as in the previous embodiment having a radial flange 10', whereas a retaining clamp 9' engages on its other end. In this embodiment the driving cable 5 is not fixed directly to the transport bridge but instead to an extension pipe 5' whose end has a radial member or mounting support 26 which extends through the longitudinal slot 8b of tubular body 8' within the transport bridge, and is guided between arms 4a and 4b of the transport bridge. The tubular body 8' is in this case prevented from rotating by a projection 27 on flange 10' which engages in a corresponding hole 28 in arm 4b. The opening 12' in arm 4b has, as shown in FIG. 5, a lateral slot 29 through which can be guided the member extension 26 of extension pipe 5'. Pipe 5' is then rotated by 90° into its position for use.

The extension pipe 5' serves as a guide for the slotted tubular body 8' onto the fixed guiding tube 6 the outer surface of pipe 5' is covered with fibres to prevent rattling. As clearly shown in FIG. 4, the sheath 6 need not extend into the tubular body 8' when the transport bridge 4 is not in the position where the sliding roof 1 is in the closed position. In this Figure the extension pipe 5' guides the tubular body 8' onto the tube 6 as the transport bridge 4 is moved to the right or open position of the sliding roof 1.

What we claim is:

1. A vehicle sliding roof construction with a rigid sliding roof articulated to transport bridge, the bridge being U-shaped in cross-section, a driving cable rigid under compression slidably received or guided in a longitudinally slotted pipe mounted on the fixed roof portion, the pipe slidably receivable in the tubular body fixed to the transport bridge at least when the roof is in the open position, the tubular body comprising a longitudinally slotted plastic member which passes through the arms of the transport bridge, the tubular body having means securing the body to the said transport bridge so that the tubular body cannot rotate and become axially displaced, means fixing the driving cable to the transport bridge within the same comprising a clamping collar fixed on the cable and having cross bars projecting through and beyond the longitudinal slots of the pipe and of the tubular body.

2. A vehicle sliding roof construction according to claim 1, wherein the two ends of the tubular body are provided with flanges which engage on the outsides of the arms of the transport bridge, and wherein one end is provided with axial slots in order to permit flexing and reduction in the size of the flange of this end and a passage thereof through openings in the said arms, whilst the other end is provided with non-circular surfaces which cooperate with complementary surfaces in an opening of one of the arms in order to secure the tubular body against rotation.

3. A vehicle sliding roof construction according to claim 1, wherein a bracket is fitted to the cross-member of the bridge between the arms of the transport bridge and extends over the tubular body oppositely from the cross-member, and the cross bars of the cable collar being screwed to the said bracket and wherein openings are provided in the said cross-member through which the attachment screws are accessible from below.

4. A vehicle sliding roof construction according to claim 1, wherein the end of the driving cable is fixed to an extension pipe which is in turn fixed to the transport bridge by a mounting support secured to the extension pipe which support passes through the longitudinal slot of the tubular body, the opening in the tubular body being slightly larger than the fixed cable guiding pipe, whereby the last named pipe may be slidably received therein.

5. A vehicle sliding roof according to claim 4, wherein the outer surface of the extension pipe is covered with fibres.

6. Remotely controlled actuating means for the roof portion of a vehicle, slidably guided for translation in a direction fixed with the vehicle, comprising, a slide guided for translation in said direction and U-shaped in transverse section parallel to said direction, to define a central base portion and first and second parallel, laterally-spaced walls upstanding along the respective opposed edges of said base portion, a tube of synthetic plastic spanning and fixed at its ends with said walls, parallel to said direction, there being a first slot in and through said tube longitudinally thereof, an operating cable having one end received in said tube and having a radial extension fixed thereto, between said walls and fitting said slot, first means on said cable operable to translate said slide by and in response to axial force on said cable, and linkage means connected with said slide for operative attachment to the slidable roof portion of a vehicle.

7. Actuating means as recited in claim 6, said first means comprising a clamp encircling and fixed with said cable, between said walls and having an extension passing through said first slot to the exterior of said tube for guidance thereby, and a bracket fixedly connecting the exterior portion of said extension with said slide.

8. Actuating means as recited in claim 7, said cable comprising a tubular sheath and a core, extending into and through the walls of said slide, there being a slot in and through said sheath in registration with said first slot nd through which slots said extension passes with a smooth fit.

9. Actuating means as recited in claim 8, there being first and second apertures in and through said walls, respectively, aligned in said direction, one said aperture being non-circular, said tube having first and second flanges at its respective ends, each in contact with the outer surface of its wall, said tube being formed adjacent said first flange, with an external surface conforming to and fitting said non-circular aperture.

10. Actuating means as recited in claim 9, said tube having at least one slot extending from and through said second flange for a limited distance longitudinally of the tube, whereby the tube may be temporarily distorted for insertion in succession through said apertures and into finally assembled relation with said slide, as aforesaid.

11. Actuating means as recited in claim 6, said tube being of plastic selected from the group consisting of polyamide and PTFF.

12. Actuating means as recited in claim 6, said first means comprising a bracket of inverted "U" shape, said extension including coplanar ends turned outwardly in opposite directions, a pair of screws each passing through an aperture in said coplanar ends, respectively, and threadedly connected to said central portion of said bracket, there being apertures in said base portion of said slide, each in registering subjacent relation with a respective one of said screws to allow access of a turning tool thereto.

13. Actuating means as recited in claim 6, said tube passing through aligned apertures in the walls of said slide, said extension having an axial dimension for a smooth fit between said walls.

* * * * *